US011639750B2

(12) United States Patent
Ono

(10) Patent No.: US 11,639,750 B2
(45) Date of Patent: *May 2, 2023

(54) DYNAMIC DAMPER

(71) Applicant: TOYOTA JIDOSHA KABUSHIKI KAISHA, Toyota (JP)

(72) Inventor: Tomoyuki Ono, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/452,329

(22) Filed: Oct. 26, 2021

(65) Prior Publication Data

US 2022/0128142 A1 Apr. 28, 2022

(30) Foreign Application Priority Data

Oct. 28, 2020 (JP) .............................. JP2020-180636

(51) Int. Cl.
*F16H 57/00* (2012.01)
*F16F 15/12* (2006.01)
*F16F 15/124* (2006.01)

(52) U.S. Cl.
CPC ..... *F16H 57/0006* (2013.01); *F16F 15/1201* (2013.01); *F16F 15/124* (2013.01);
(Continued)

(58) Field of Classification Search
CPC .... F16F 15/1201; F16F 15/124; F16F 15/126; F16F 2224/025; F16F 2230/0005; F16F 2232/08; F16H 57/0006; F16H 2057/0012
See application file for complete search history.

(56) References Cited

U.S. PATENT DOCUMENTS 3,075,406 A 1/1963 Butler et al.
3,307,419 A * 3/1967 Brickett .................. F16H 55/14
74/411

(Continued)

FOREIGN PATENT DOCUMENTS

DE 102016123896 A1 * 6/2017 ................ F16C 3/02
JP H0828627 A * 2/1996
JP 3852208 B2 11/2006

OTHER PUBLICATIONS

Non-Final Office Action, issued from the United States Patent and Trademark Office, to U.S. Appl. No. 17/451,821 dated May 27, 2022, 13 pages.

(Continued)

*Primary Examiner* — Adam D Rogers
(74) *Attorney, Agent, or Firm* — Hunton Andrews Kurth LLP

(57) ABSTRACT

A dynamic damper includes: a mass body that is disposed inside a rotation shaft and extends along a shaft center of the rotation shaft; and an elastic body interposed between the mass body and the rotation shaft. Further, the mass body is allowed to vibrate to a linear motion state, the elastic body includes: first and second contact surfaces, when the gear generates vibration so as to fall from a radial direction of the rotation shaft to an axial direction side of the rotation shaft, compressive stress acts on the elastic body by the mass body vibrating so as to push the first contact surface in response to the vibration, and when the gear generates vibration along the axial direction, compressive stress acts on the elastic body by the mass body coming in the linear motion state and vibrating so as to push the second contact surface.

7 Claims, 14 Drawing Sheets

(52) U.S. Cl.
CPC . *F16F 2224/025* (2013.01); *F16F 2230/0005* (2013.01); *F16F 2232/08* (2013.01)

(56) References Cited

U.S. PATENT DOCUMENTS

| | | | |
|---|---|---|---|
| 3,343,377 A * | 9/1967 | Andreloupere | F16F 15/1201 |
| | | | 464/154 |
| 4,325,589 A | 4/1982 | Hirt | |
| 5,865,429 A | 2/1999 | Gautheron | |
| 6,837,345 B1 | 1/2005 | Lauble et al. | |
| 7,044,276 B2 | 5/2006 | Haneishi et al. | |
| 8,323,118 B2 | 12/2012 | Ikeda | |
| 9,702,429 B2 | 7/2017 | Mueller et al. | |
| 9,889,506 B2 | 2/2018 | Nakatani et al. | |
| 9,927,064 B2 | 3/2018 | Rippelmeyer et al. | |
| 2017/0241471 A1 | 8/2017 | Murrish et al. | |
| 2022/0128141 A1* | 4/2022 | Ono | F16H 57/043 |
| 2022/0128142 A1 | 4/2022 | Ono | |

OTHER PUBLICATIONS

Final Office Action, United States Patent and Trademark Office, issued to U.S. Appl. No. 17/451,821 dated Sep. 9, 2022, 13 pages.
Notice of Allowance, United States Patent and Trademark Office, issued to U.S. Appl. No. 17/451,821 dated Dec. 27, 2022, 14 pages.

* cited by examiner

FALLING RESONANCE MODE

AXIAL RESONANCE MODE

DYNAMIC DAMPER

CROSS-REFERENCE TO RELATED APPLICATION(S)

The present application claims priority to and incorporates by reference the entire contents of Japanese Patent Application No. 2020-180636 filed in Japan on Oct. 28, 2020.

BACKGROUND

The present disclosure relates to a dynamic damper.

Japanese Patent No. 3852208 discloses that a dynamic damper is disposed inside a hollow counter shaft in order to prevent vibration generated in a power transmission device from transmitting to a case. In the dynamic damper, a mass body extends along a shaft center of the counter shaft, and the mass body is coupled to an inner peripheral portion of the counter shaft via a cylindrical elastic body.

In a counter gear mechanism, one vibration mode (axial resonance mode) and the other vibration mode (falling resonance mode) are generated with axial thrust force generated by the meshing helical gears, which serves as compelling force. In the axial resonance mode, the gear vibrates along the axial direction. In the falling resonance mode, the gear vibrates so as to fall in the axial direction in a counter driven gear on the large-diameter side.

SUMMARY

There is a need for providing a dynamic damper capable of exerting a damping effect in response to both vibration generated by falling of a gear and axial vibration of the gear.

According to an embodiment, a dynamic damper for inhibiting vibration generated by a gear attached to a rotation shaft, includes: a mass body that is disposed inside a rotation shaft of hollow shape and extends along a shaft center of the rotation shaft; and an elastic body interposed between the mass body and the rotation shaft. Further, the mass body is allowed to vibrate to a linear motion state in which the mass body reciprocates along the shaft center of the rotation shaft, the elastic body includes: a first contact surface that is in contact with the mass body and parallel to an axial direction of the rotation shaft; and a second contact surface that is in contact with the mass body at a position different from the first contact surface and not parallel to the axial direction of the rotation shaft, when the gear generates vibration so as to fall from a radial direction of the rotation shaft to an axial direction side of the rotation shaft, compressive stress acts on the elastic body by the mass body vibrating so as to push the first contact surface in response to the vibration, and when the gear generates vibration along the axial direction of the rotation shaft, compressive stress acts on the elastic body by the mass body coming in the linear motion state in response to the vibration and vibrating so as to push the second contact surface.

DETAILED DESCRIPTION

In the configuration described in Japanese Patent No. 3852208, it is not considered that an object to be damped has two vibration modes (axial resonance mode and falling resonance mode), and a mass body is simply coupled to a hollow portion of a rotation shaft via a cylindrical elastic body. For that reason, the configuration may fail to address both the vibration modes.

Hereinafter, a dynamic damper according to an embodiment of the present disclosure will be specifically described with reference to the drawings. Note that the present disclosure is not limited to the embodiments described below.

Power Transmission Device

Figure 1:
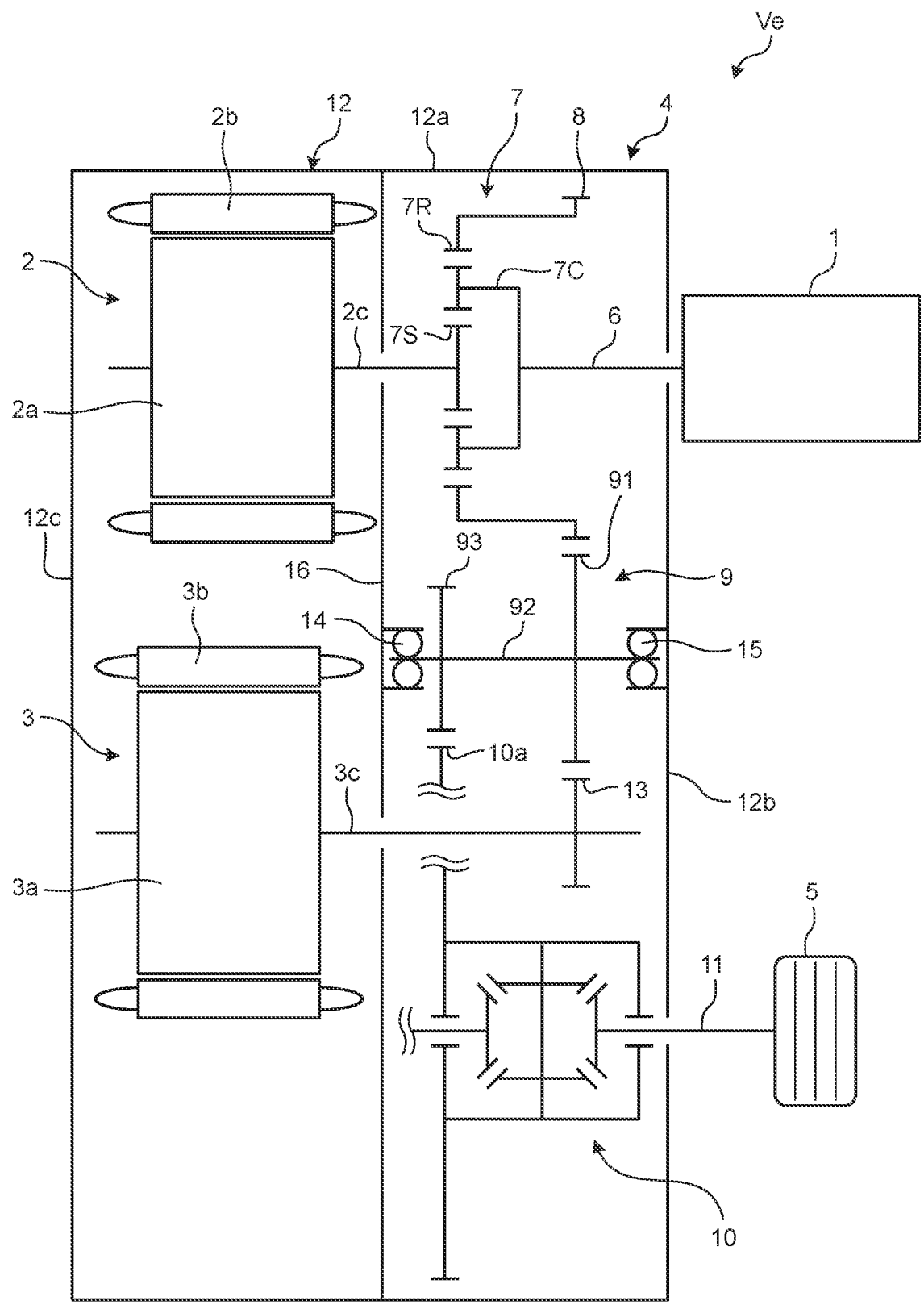
FIG. 1 is a skeleton diagram schematically illustrating a vehicle provided with a dynamic damper according to an embodiment.

FIG. 1 is a skeleton diagram schematically illustrating a vehicle provided with a dynamic damper according to an embodiment. As illustrated in FIG. 1, a vehicle Ve is a hybrid vehicle including an engine 1, a first motor 2, and a second motor 3 as power sources. Each of the motors 2 and 3 is a motor generator having a motor function and a power generation function, and is electrically connected to a battery via an inverter. In the vehicle Ve, power output from a power source is transmitted to a wheel 5 via a power transmission device 4.

The power transmission device 4 includes an input shaft 6, a planetary gear mechanism 7, an output gear 8, a counter gear mechanism 9, a differential gear mechanism 10, and a drive shaft 11. Furthermore, the vehicle Ve includes a case 12 that houses a gear mechanism included in the power transmission device 4. The first motor 2, the second motor 3, the planetary gear mechanism 7, the output gear 8, the counter gear mechanism 9, and the differential gear mechanism 10 are housed inside the case 12.

The input shaft 6, the planetary gear mechanism 7, and the first motor 2 are disposed on the same axis as a crankshaft of the engine 1. The first motor 2 is adjacent to the planetary gear mechanism 7, and disposed on the side opposite to the engine 1 in an axial direction. The first motor 2 includes a rotor 2a, a stator 2b, and a rotor shaft 2c. A coil is wound around the stator 2b.

The planetary gear mechanism 7 is a power dividing mechanism, and divides power output from the engine 1 into power on the side of the first motor 2 and power on the side of the wheel 5. At that time, the first motor 2 generates power by the power output from the engine 1. The electric power is stored in the battery, or supplied to the second motor 3 via the inverter.

The planetary gear mechanism 7 is a single-pinion planetary gear mechanism, and includes a sun gear 7S, a carrier 7C, and a ring gear 7R as three rotating elements. The rotor shaft 2c of the first motor 2 is coupled to the sun gear 7S so as to rotate integrally. The input shaft 6 is coupled to the carrier 7C so as to rotate integrally. The engine 1 is coupled to the carrier 7C via the input shaft 6. The output gear 8 is integrated with the ring gear 7R. The output gear 8 outputs torque from the planetary gear mechanism 7 to the side of the wheel 5. The output gear 8 rotates integrally with the ring gear 7R, and meshes with a counter driven gear 91 of the counter gear mechanism 9.

The counter gear mechanism 9 includes the counter driven gear 91, a counter shaft 92, and a counter drive gear 93. The counter shaft 92 is disposed in parallel with the input shaft 6. The counter driven gear 91 and the counter drive gear 93 are attached to the counter shaft 92 so as to rotate integrally. The counter drive gear 93 meshes with a differential ring gear 10a of the differential gear mechanism 10. The wheels 5 are coupled to the differential gear mechanism 10 via the right and left drive shafts 11.

Furthermore, the vehicle Ve can add torque output from the second motor 3 to torque transmitted from the engine 1 to the wheel 5. The second motor 3 includes a rotor 3a, a stator 3b, and a rotor shaft 3c. A coil is wound around the stator 3b.

The rotor shaft 3c is disposed in parallel with the counter shaft 92. A reduction gear 13 is provided on the rotor shaft 3c. The reduction gear 13 meshes with the counter driven gear 91.

The case 12 includes a case member 12a, a front cover 12b, and a rear cover 12c. The case member 12a houses the power transmission device 4. The front cover 12b is a cover member on the side of the engine 1, and is bolted to the case member 12a. The rear cover 12c is a cover member on the side of each of the motors 2 and 3, and is bolted to the case member 12a.

A motor chamber and a gear chamber are partitioned by a center support 16 inside the case 12. The motor chamber houses each of the motors 2 and 3. The gear chamber houses the power transmission device 4 including the gear mechanism. The center support 16 is a partition wall that distinguishes the motor chamber and the gear chamber, and is a fixing portion integrated with the case 12. The center support 16 includes a through hole through which the rotor shaft 2c of the first motor 2 is inserted and a through hole through which the rotor shaft 3c of the second motor 3 is inserted. Each of the rotor shafts 2c and 3c extends to the motor chamber and the gear chamber through each through hole.

The case 12 supports both ends of the counter shaft 92 with a first bearing 14 and a second bearing 15 in the gear chamber. The first bearing 14 is a rolling bearing attached to an end on one side of the counter shaft 92, and has an outer ring attached to the center support 16. The second bearing 15 is a rolling bearing attached to an end on the other side of the counter shaft 92, and has an outer ring attached to the front cover 12b.

Figure 2:
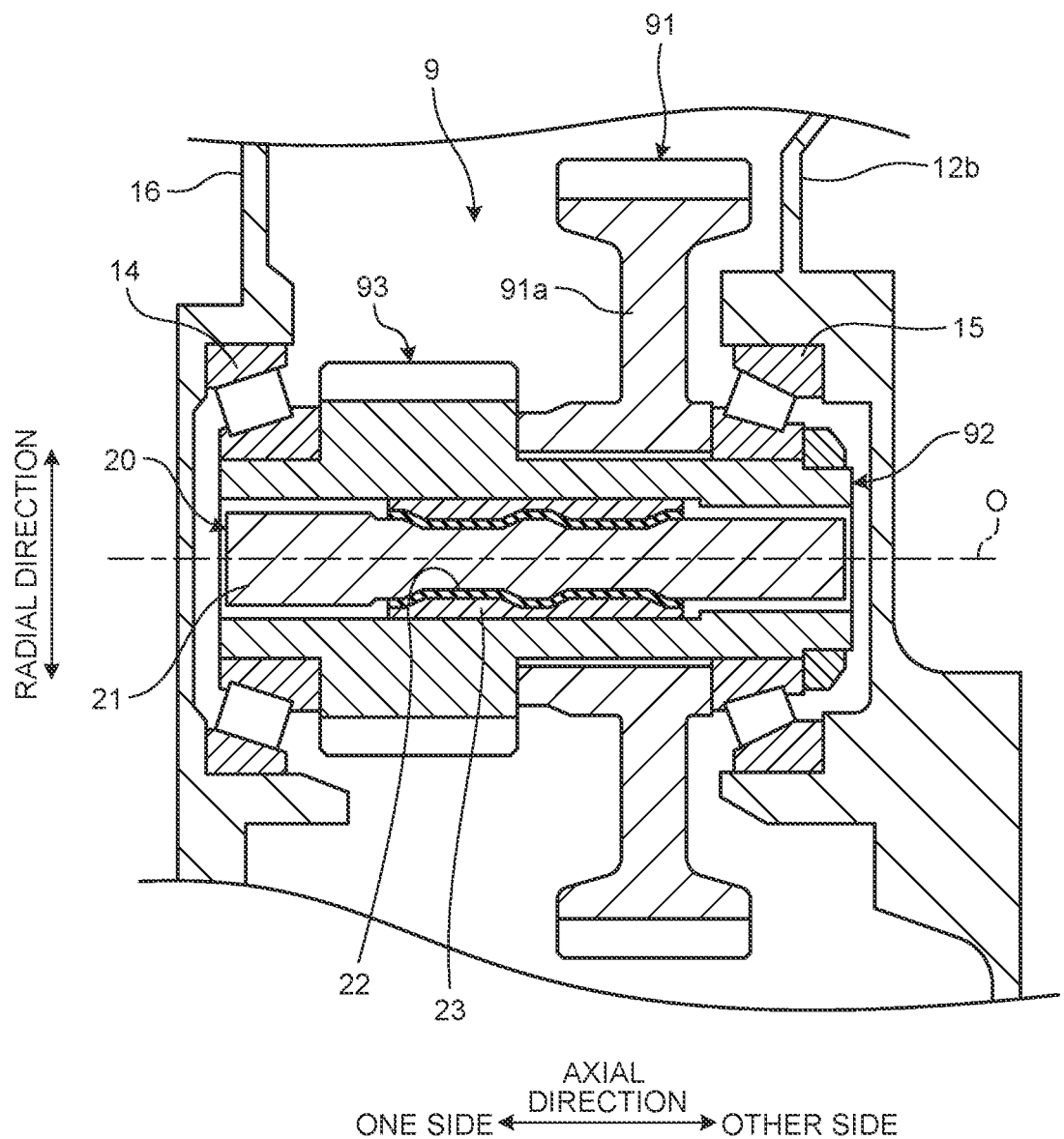
FIG. 2 is a cross-sectional view schematically illustrating a counter gear mechanism.

Furthermore, as illustrated in FIG. 2, the counter driven gear 91 is spline-fitted to the counter shaft 92. The counter driven gear 91 includes a helical gear. That is, the meshing portion between the counter driven gear 91 and the output gear 8 and the meshing portion between the counter driven gear 91 and the reduction gear 13 are meshing portions between helical gears. For that reason, vibration is generated with a load (thrust force) in the axial direction generated by the meshing helical gears, which serves as compelling force, in the counter driven gear 91. Therefore, a dynamic damper 20 (illustrated in FIG. 2 and the like) is provided on the counter shaft 92 in the embodiment in order to inhibit vibration generated at the counter driven gear 91 from transmitting to the case 12 via the first bearing 14 and the second bearing 15. As a result, before the vibration is transmitted from each of the bearings 14 and 15 to the case 12, the vibration transmission is inhibited by damping the vibration at the counter shaft 92, and radiation sound from the case 12 is reduced.

Overall Configuration of Damper

Figure 3:
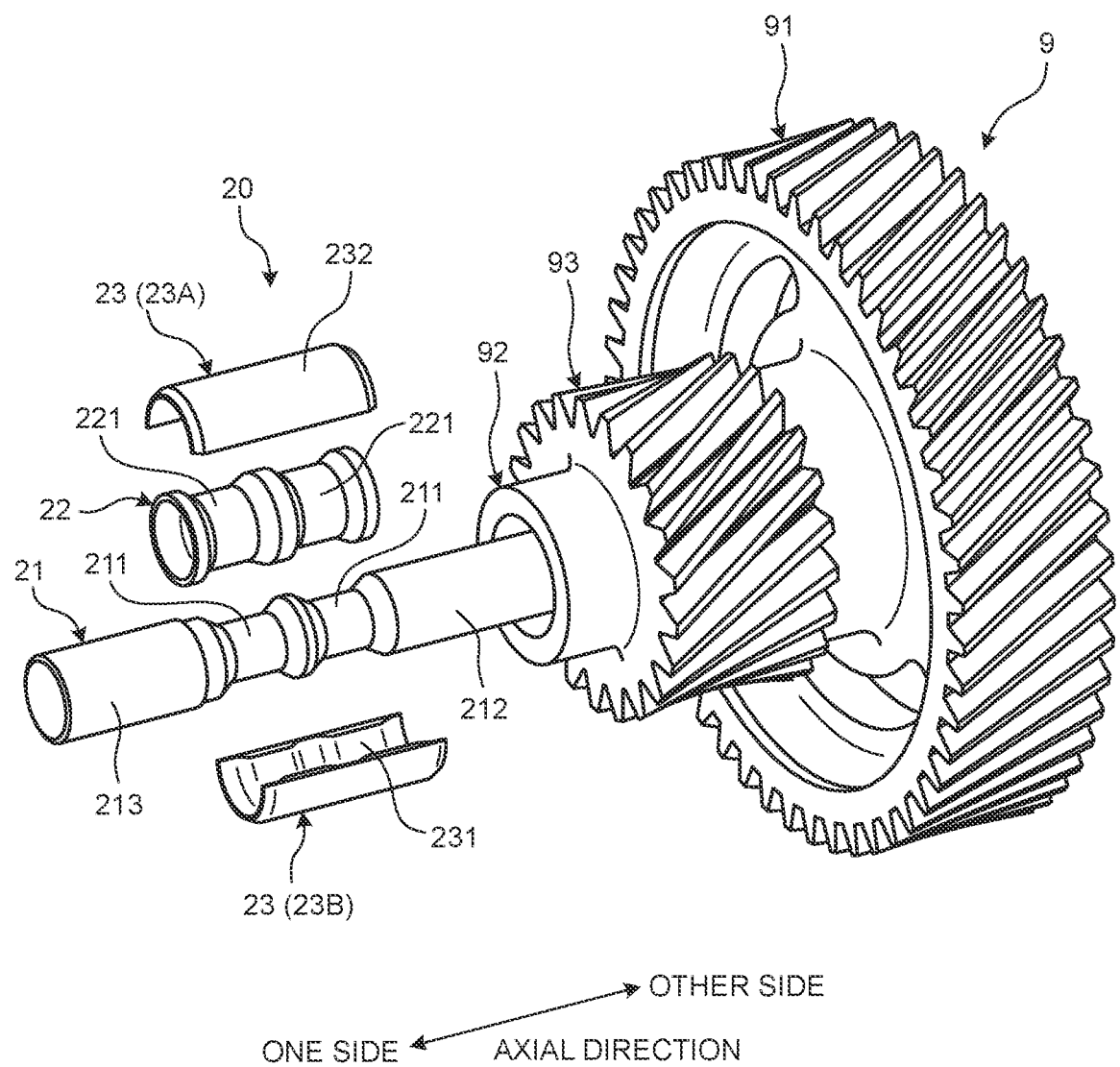
FIG. 3 is a perspective view for illustrating the dynamic damper.

As illustrated in FIG. 2, the dynamic damper 20 is disposed inside the hollow counter shaft 92. As illustrated in FIG. 3, the dynamic damper 20 includes a mass body 21, a rubber 22, and a holder 23.

The mass body 21 is a rod-shaped inertial mass body that vibrates in response to vibration of the counter shaft 92, and extends along the shaft center O of the counter shaft 92. The mass body 21 is coupled to the inside of the counter shaft 92 via the rubber 22. Then, the mass body 21 vibrates in response to the vibration of the counter shaft 92 while being held by the rubber 22.

The rubber 22 is a tubular member in contact with the mass body 21. The dynamic damper 20 uses a polymer material for a spring, and includes the rubber 22 as an elastic body. Then, vibration of the mass body 21 in response to the vibration of the counter driven gear 91 causes compressive stress to act on the rubber 22.

Figure 4:
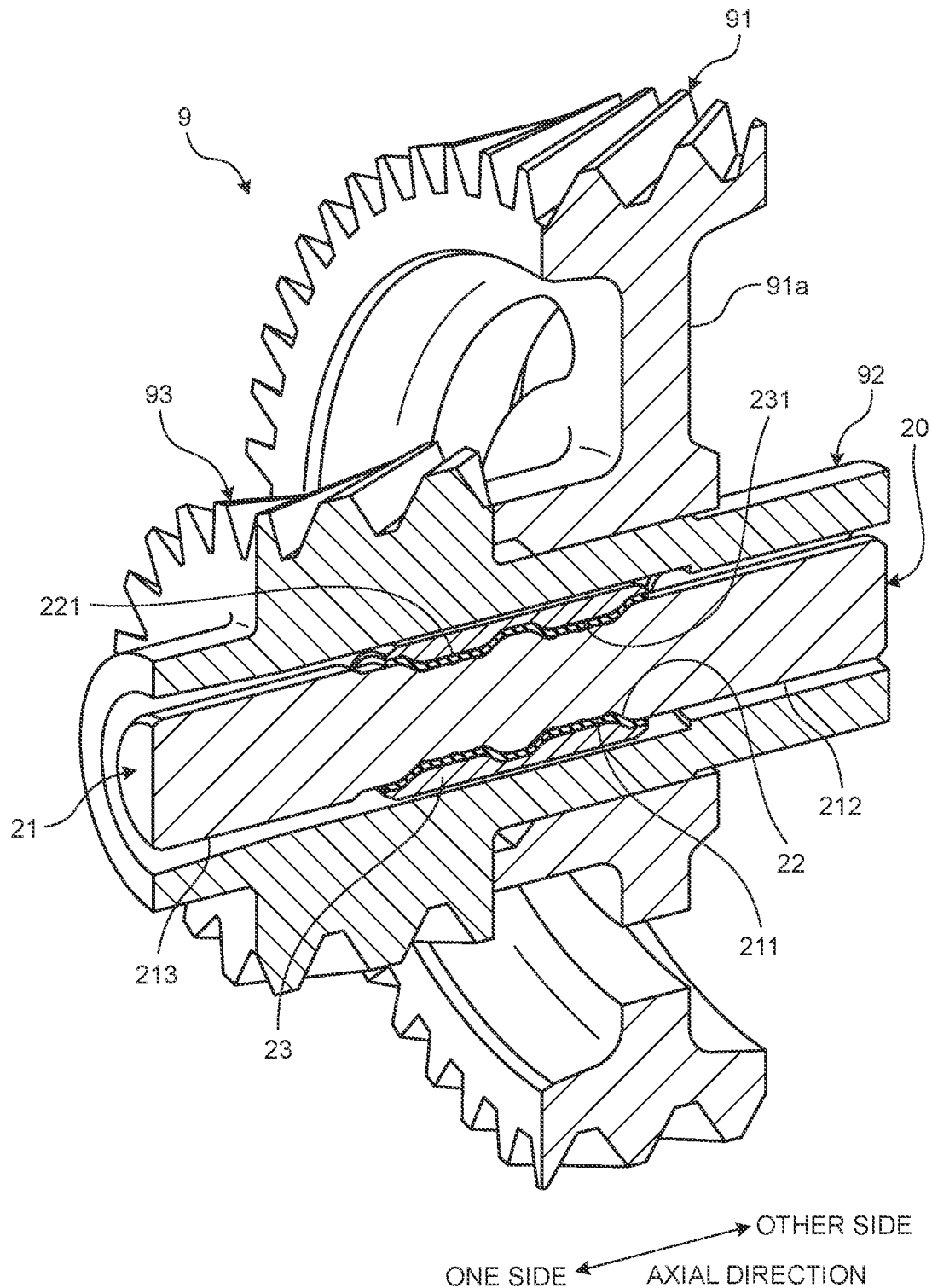
FIG. 4 is a cross-sectional view for illustrating the dynamic damper.

The holder 23 is a tubular member that integrally holds the mass body 21 and the rubber 22, and is attached inside the counter shaft 92. As illustrated in FIG. 3, the holder 23 includes a pair of members 23A and 23B having a shape in which a tubular member is halved. The pair of members 23A and 23B is integrated so as to cover the outer peripheral portion of the rubber 22 from the state before assembly illustrated in FIG. 3. Then, after the assembly, as illustrated in FIG. 4, the holder 23 is press-fitted into the counter shaft 92.

Resonance Mode of Counter Driven Gear

A resonance mode of the counter driven gear 91 will be described. Falling resonance and axial resonance are generated with thrust force generated by the meshing helical gears, which serves as compelling force, in the counter driven gear 91.

Figure 5:
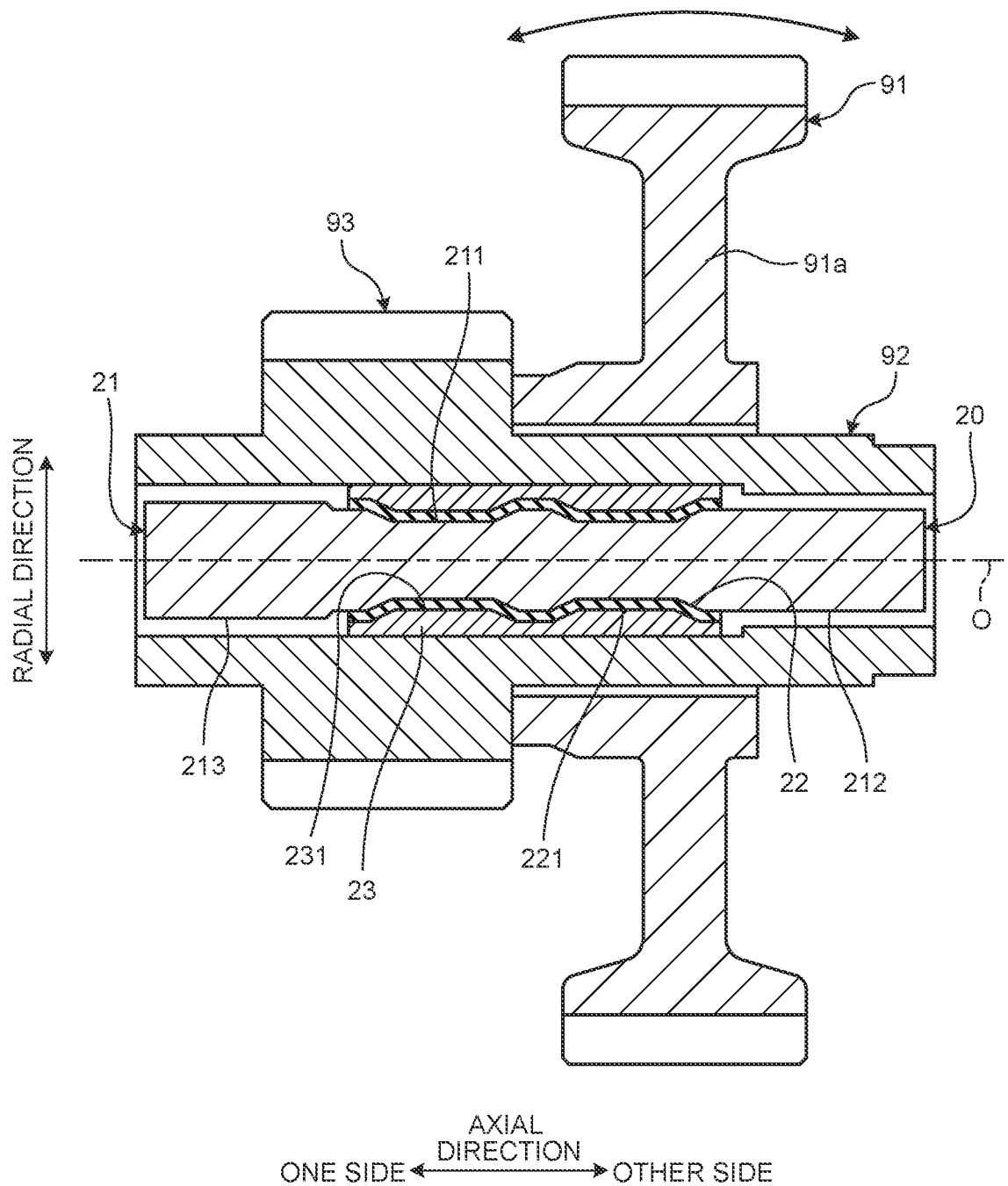
FIG. 5 is a cross-sectional view for illustrating a falling resonance mode of a counter driven gear.
Figure 6:
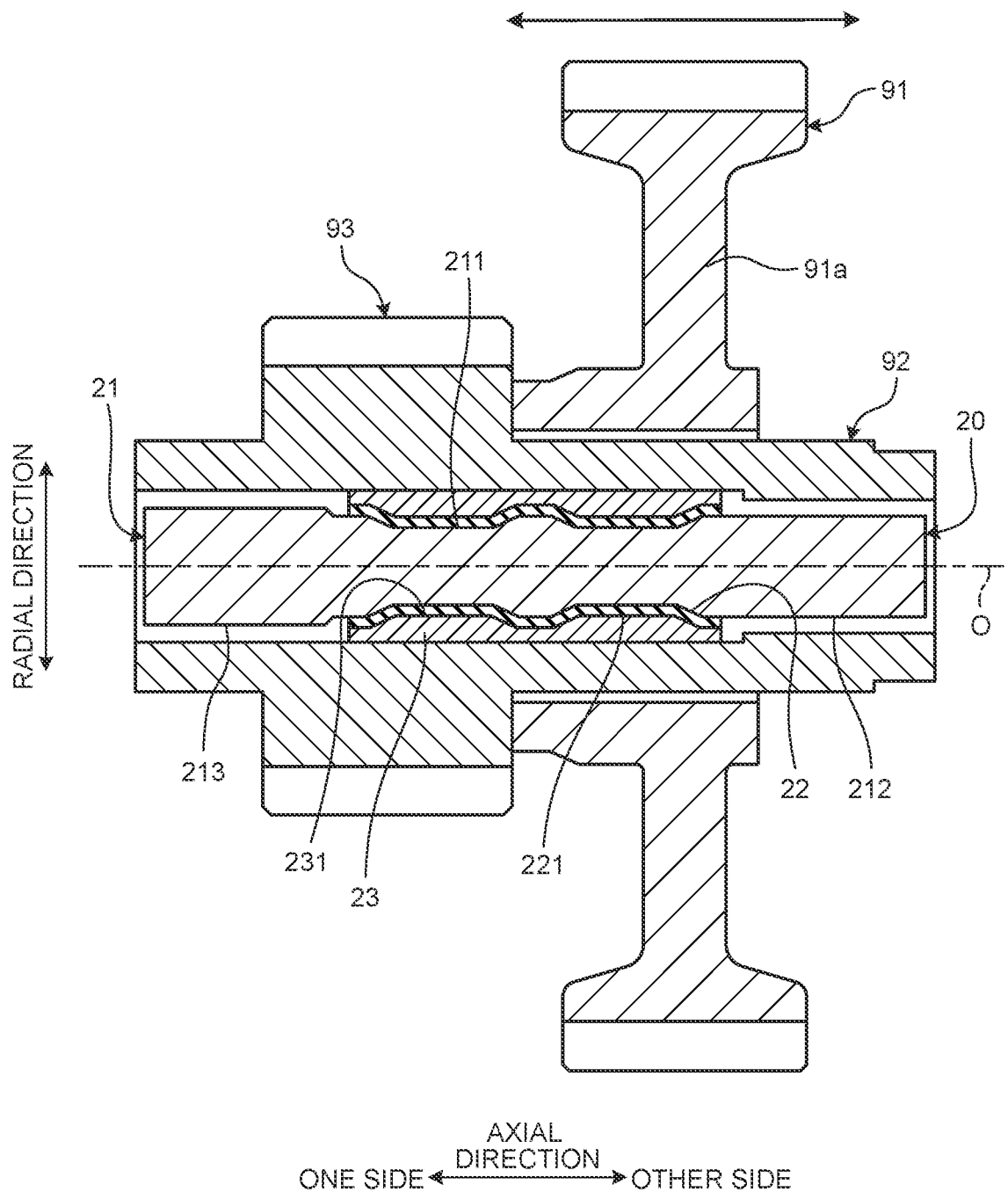
FIG. 6 is a cross-sectional view for illustrating an axial resonance mode of the counter driven gear.

As illustrated in FIG. 5, the falling resonance is a vibration mode (falling resonance mode) in which the counter driven gear 91, which is a large-diameter gear, vibrates so as to fall to the axial direction side. As illustrated in FIG. 6, the axial resonance is a vibration mode (axial resonance mode) in which the counter driven gear 91 vibrates in the axial direction.

As described above, the counter driven gear 91 has two resonance frequencies of the resonance frequency of the falling resonance mode and the resonance frequency of the axial resonance mode. That is, when the counter shaft 92 that rotates integrally with the counter driven gear 91 is to be damped, there are two target resonance frequencies.

Moreover, the resonance frequency of the falling resonance mode is lower than the resonance frequency of the axial resonance mode in the counter driven gear 91. Specifically, the resonance frequency of the falling resonance mode is approximately 2.6 kHz, and the resonance frequency of the axial resonance mode is approximately 3.6 kHz. This is because, since the counter driven gear 91 is a large-diameter gear, the bending primary mode of a spoke portion 91*a* is set at the time of falling resonance, whereas a secondary mode is set at the time of axial resonance.

Therefore, in the embodiment, the resonance frequency of the dynamic damper 20 is matched with the resonance frequency of a target, and the resonance mode of the dynamic damper 20 is set to cancel the resonance mode of the target, so that the damping effect corresponding to both the resonance modes is exhibited. That is, the resonance frequency of the dynamic damper 20 is matched with the resonance frequency of the falling resonance mode and the resonance frequency of the axial resonance mode.

Resonance Mode of Dynamic Damper

The dynamic damper 20 can vibrate in a damper inclination mode and a damper front-rear mode. The damper inclination mode is a resonance mode of a dynamic damper corresponding to the falling resonance mode. The damper front-rear mode is a resonance mode of a dynamic damper corresponding to the axial resonance mode.

Figure 7:
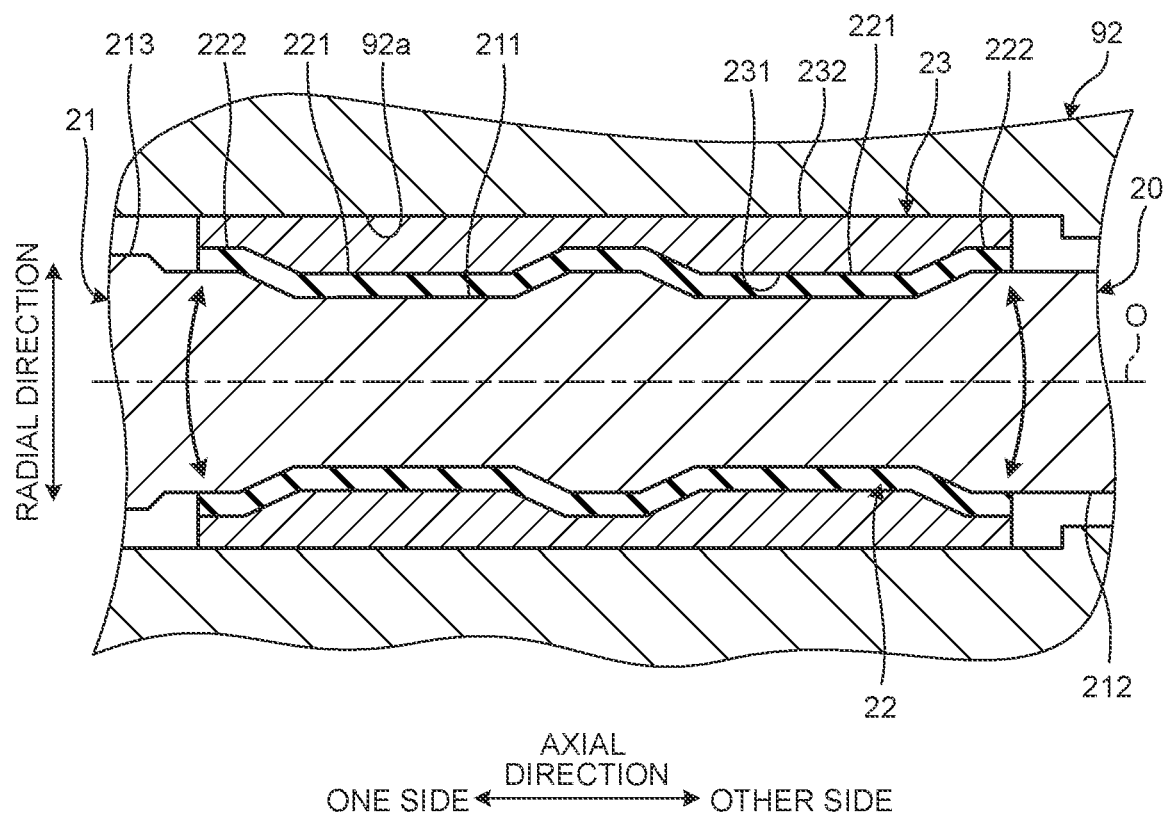
FIG. 7 is a cross-sectional view for illustrating a damper inclination mode.
Figure 8:
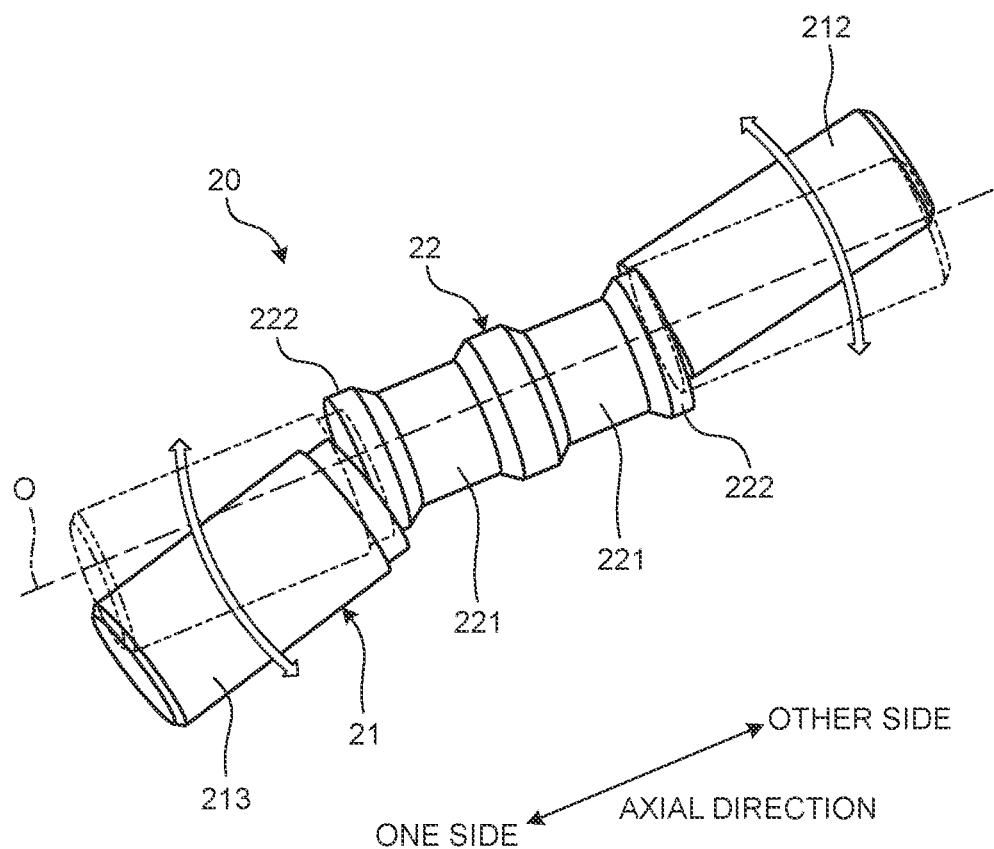
FIG. 8 is a perspective view for illustrating the damper inclination mode.
Figure 9:
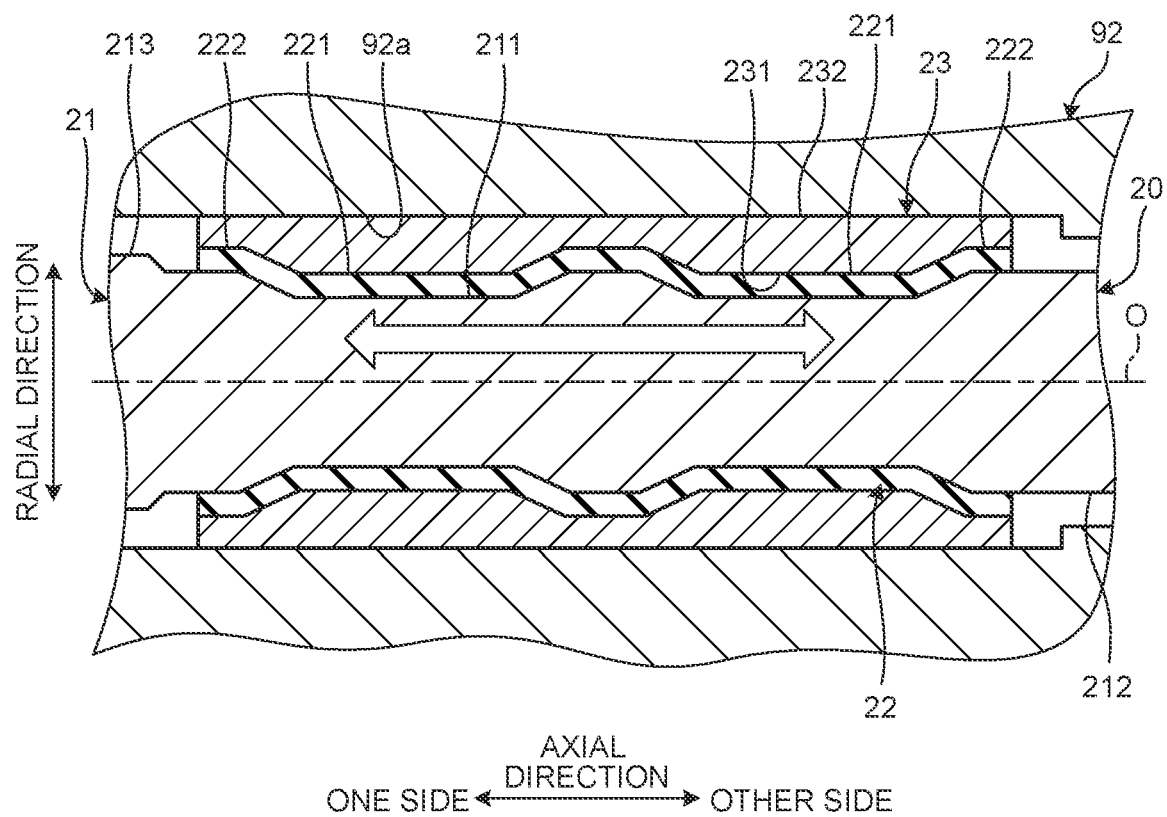
FIG. 9 is a cross-sectional view for illustrating a damper front-rear mode.
Figure 10:
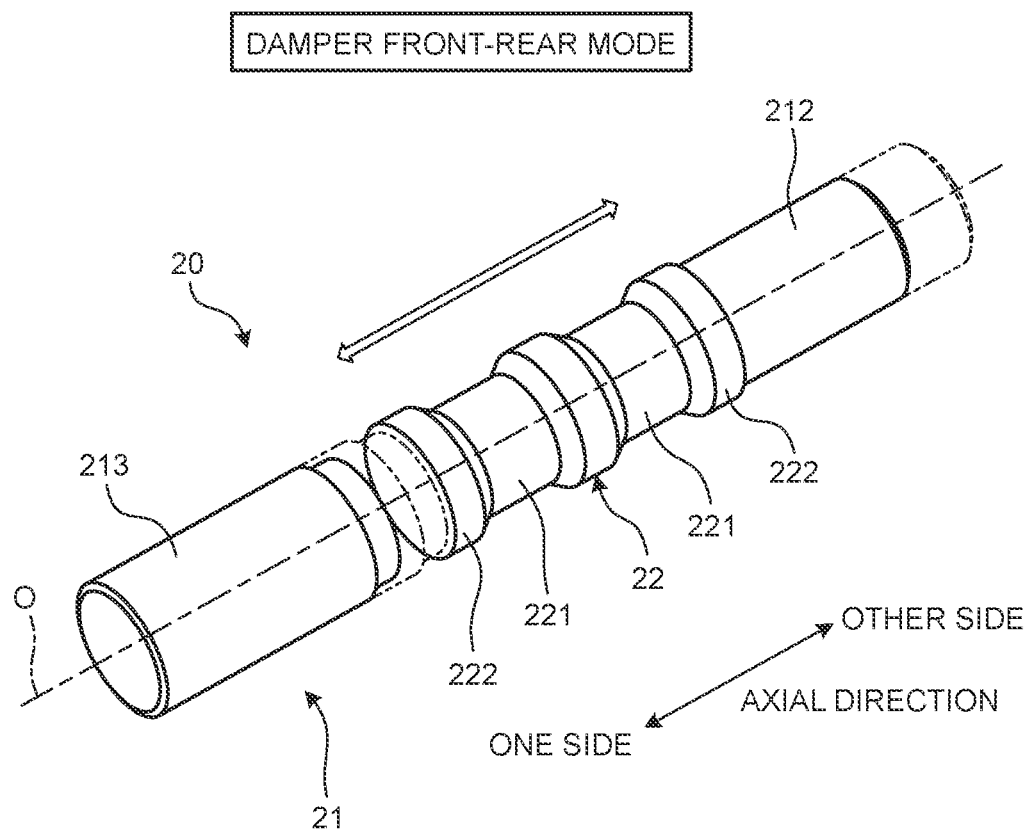
FIG. 10 is a perspective view for illustrating the damper front-rear mode.

As illustrated in FIGS. 7 and 8, the damper inclination mode is a resonance mode in which the mass body 21 vibrates so as to take a posture inclined to the shaft center O. That is, the mass body 21 swings to the shaft center O in the damper inclination mode. In contrast, as illustrated in FIGS. 9 and 10, the damper front-rear mode is a resonance mode in which the mass body 21 moves forward and backward in the axial direction along the shaft center O. That is, the mass body 21 reciprocates along the axial direction in the damper front-rear mode.

Note that, in FIG. 8, the posture (displacement) of the mass body 21 is exaggerated so that the swing state of the mass body 21 is clear. similarly, in FIG. 10, the displacement of the mass body 21 is exaggerated so that the linear motion state of the mass body 21 is clear.

Then, when the counter driven gear 91 generates the falling resonance (see FIG. 5), the dynamic damper 20 is in the damper inclination mode, and the mass body 21 is in a swing state (see FIG. 8). As described above, resonance of the dynamic damper 20 in an inclination direction (direction inclined to shaft center O) cancels transmission of vibration of the falling resonance of the counter driven gear 91.

Furthermore, when the counter driven gear 91 generates axial resonance (see FIG. 6), the dynamic damper 20 is in the damper front-rear mode, and the mass body 21 is in a linear motion state (see FIG. 10). As described above, resonance of the dynamic damper 20 in the axial direction cancels transmission of vibration of the axial resonance of the counter driven gear 91.

Resonance Frequency of Dynamic Damper

A resonance frequency f of a dynamic damper is expressed by the following expression (1) by using a spring constant k and a mass m.

$$f=(1/2\pi)\sqrt{k/m} \quad (1)$$

The rubber 22 made of polymer material is provided as a spring of a dynamic damper in the dynamic damper 20. For that reason, the resonance frequency of the dynamic damper 20 can be expressed by using the elastic modulus of the rubber 22 instead of the spring constant k in the above expression (1).

The elastic modulus of the rubber 22 includes an elastic modulus E in the compression direction and an elastic modulus G in a shearing direction. Then, the relation between the elastic modulus E in the compression direction and the elastic modulus G in the shearing direction is expressed by the following expression (2) by using the Poisson ratio ν of the rubber 22.

$$G=E/[2(1+\nu)] \quad (2)$$

In the above expression (2), the Poisson ratio ν of the rubber 22 is approximately 0.5. For that reason, the elastic modulus G in the shearing direction is smaller than the elastic modulus E in the compression direction.

Then, when the mass m is constant in the dynamic damper, the resonance frequency f is determined based on the spring constant k. That is, in the dynamic damper 20, the mass of the mass body 21 is constant, so that the resonance frequency is determined based on the elastic modulus of the rubber 22.

Here, as a comparative example, a dynamic damper including a columnar mass body and a cylindrical rubber as in a related-art structure disclosed in Japanese Patent No. 3852208 will be described. In the comparative example, the contact surface between the rubber and the mass body includes only a surface parallel to the axial direction, so that no compressive force acts on the rubber and only shearing force acts at the time of axial resonance of the counter driven gear. For that reason, the resonance frequency f is determined by the elastic modulus G in the shearing direction when the mass body vibrates in the axial direction in response to the axial resonance (damper front-rear mode) in the dynamic damper of the comparative example. In contrast, compressive force acts on the rubber at the time of falling resonance of the counter driven gear in the comparative example.

That is, the resonance frequency in the case where only the shearing force acts on the rubber (damper front-rear mode) is lower than the resonance frequency in the case where the compressive force acts on the rubber (damper inclination mode) in the dynamic damper of the comparative example. Specifically, as a result of CAE analysis, the resonance frequency in the damper front-rear mode is approximately 1.6 kHz, and the resonance frequency in the damper inclination mode is approximately 2.6 kHz in the comparative example.

In contrast, the resonance frequency in the axial resonance mode is higher than the resonance frequency in the falling resonance mode in the counter driven gear 91 to be damped. Specifically, the resonance frequency of the counter driven gear 91 is approximately 3.6 kHz in the axial resonance mode and approximately 2.6 kHz in the falling resonance mode. That is, the magnitude relation between the resonance frequencies is opposite to that of an object to be damped in the dynamic damper of the comparative example. Thus, the dynamic damper of the comparative example cannot address both of the two resonance modes in the object to be damped.

Therefore, the dynamic damper 20 of the embodiment can exert a damping effect corresponding to both of the two resonance modes of the counter driven gear 91. The dynamic damper 20 is configured such that the resonance frequency in the damper front-rear mode corresponding to the axial resonance mode is higher than the resonance frequency in the damper inclination mode corresponding to the falling resonance mode.

Detailed Structure of Dynamic Damper

Here, the dynamic damper 20 will be described in more detail.

As illustrated in FIG. 3, the dynamic damper 20 is configured such that a recess 211 is provided on an outer peripheral portion of the mass body 21 and compressive stress acts on the rubber 22 at the time when the mass body 21 vibrates in the axial direction. The rubber 22 includes a recess 221 recessed radially inward. Moreover, a protrusion 231 is provided on the inner peripheral portion of the holder 23 in the dynamic damper 20. Then, as illustrated in FIG. 4 and the like, the recess 221 of the rubber 22 is sandwiched between the recess 211 of the mass body 21 and the protrusion 231 of the holder 23. Furthermore, the mass body 21 includes non-contact portions 212 and 213, which are not in contact with the rubber 22, on both axial end sides. The non-contact portion 212 is provided on the other side in the axial direction, and the non-contact portion 213 is provided on one side in the axial direction.

Figure 11:
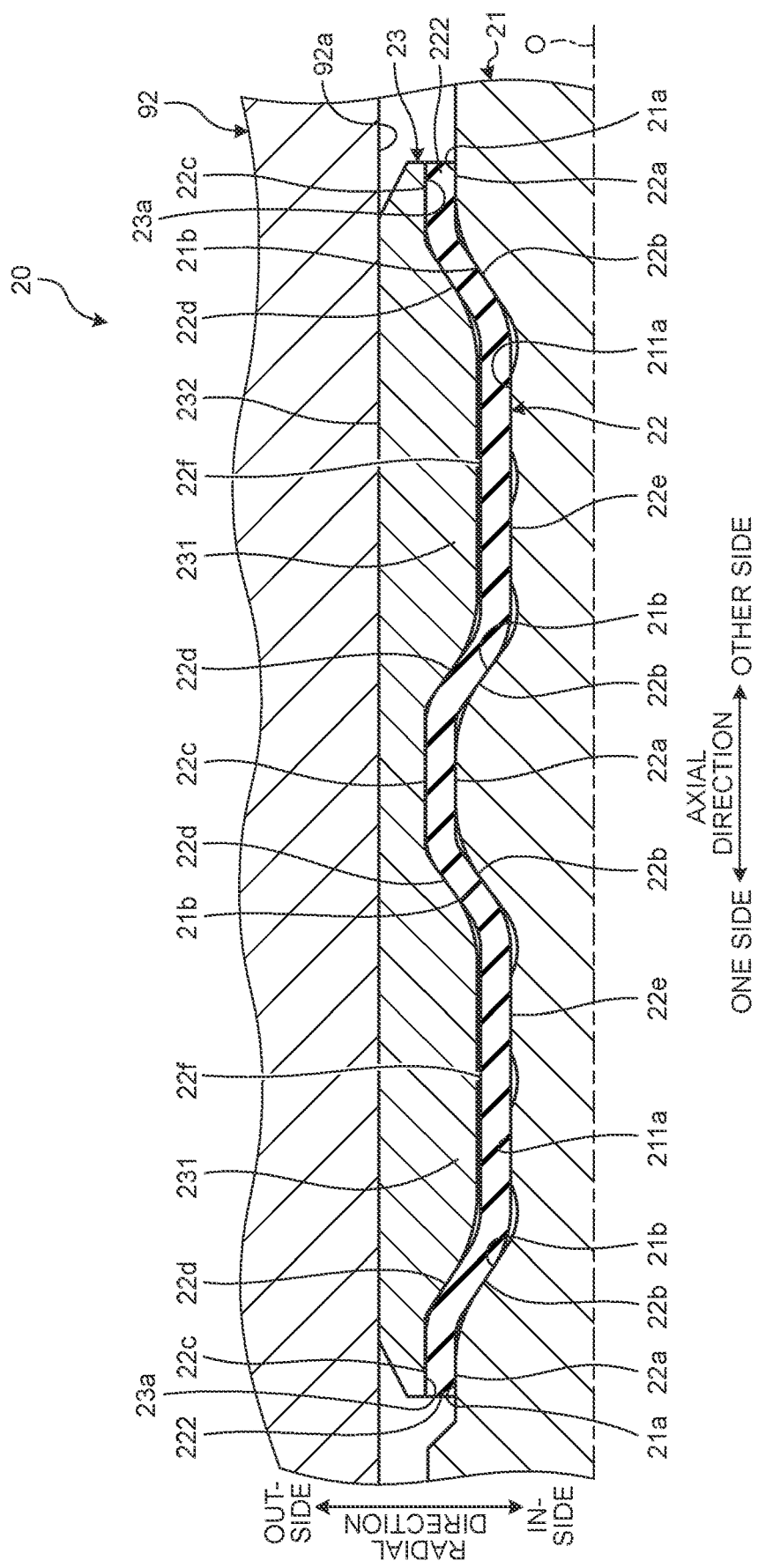
FIG. 11 is a cross-sectional view for illustrating the detailed structure of the dynamic damper.

Since the rubber 22 is formed in a tubular shape, the inner peripheral surface thereof is in contact with the mass body 21, and the outer peripheral surface thereof is in contact with the holder 23. As illustrated in FIG. 11, the inner peripheral surface of the rubber 22 includes a first contact surface 22a and a second contact surface 22b as contact surfaces with the mass body 21. The first contact surface 22a is parallel to the axial direction. The second contact surface 22b is not parallel to the axial direction. The outer peripheral surface of the rubber 22 includes a third contact surface 22c and a fourth contact surface 22d as contact surfaces with the holder 23. The third contact surface 22c is parallel to the axial direction. The fourth contact surface 22d is not parallel to the axial direction. Furthermore, both ends 222 in the axial direction of the rubber 22 are formed in a cylindrical shape along the axial direction, and are sandwiched between the mass body 21 and the holder 23 from both sides in the radial direction.

Figure 12:
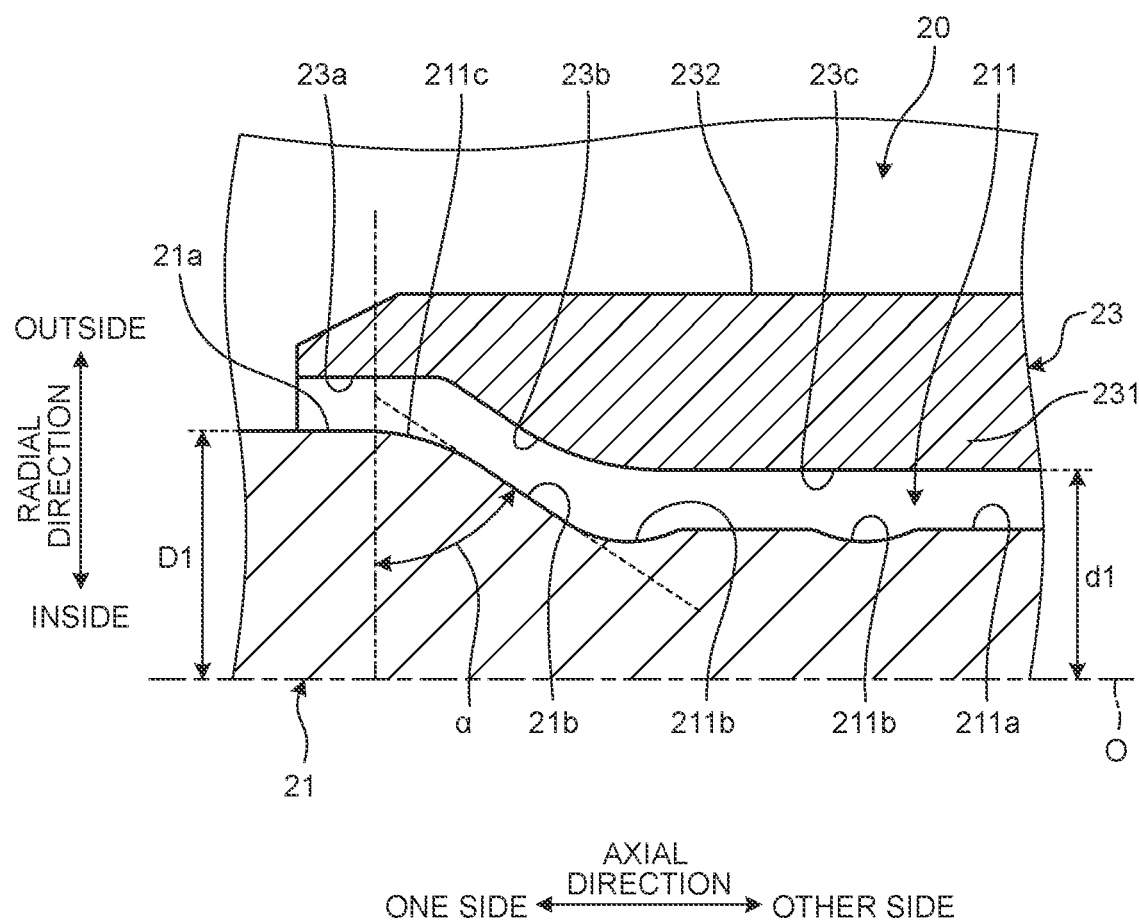
FIG. 12 is a schematic view for illustrating the detailed structure of the dynamic damper.

As illustrated in FIGS. 11 and 12, the mass body 21 includes a first contact portion 21a and a second contact portion 21b as contact portions in contact with the rubber 22. The first contact portion 21a is in contact with the first contact surface 22a. The second contact portion 21b is in contact with the second contact surface 22b.

The first contact portion 21a is formed in a shape of a column having the same diameter as the non-contact portion 212. As illustrated in FIG. 12, the first contact portion 21a is formed to have an outer diameter D1. When the dynamic damper 20 is in the damper inclination mode, swinging of the mass body 21 vibrates the first contact portion 21a such that the first contact portion 21a pushes the first contact surface 22a of the rubber 22, and causes compressive stress to act on the rubber 22.

The second contact portion 21b is included in the recess 211 recessed radially inward from the first contact portion 21a. That is, the recess 211 includes the second contact portion 21b and a bottom surface 211a. The second contact portion 21b is inclined to the axial direction. The bottom surface 211a is parallel to the axial direction. When the dynamic damper 20 is in the damper front-rear mode, linear motion of the mass body 21 vibrates the second contact portion 21b such that the second contact portion 21b pushes the second contact surface 22b of the rubber 22, and causes compressive stress to act on the rubber 22.

As illustrated in FIG. 12, the second contact portion 21b is an inclined surface inclined with respect to the radial direction. The inclined surface is a tapered surface extending in a direction inclined with respect to the radial direction, and an inclination angle $\alpha$ thereof is set to be larger than 0 degrees and smaller than 90 degrees. The second contact portion 21b set to have the inclination angle $\alpha$ can increase the contact surface with the rubber 22, and raise the axial elastic modulus of the rubber 22, that is, the elastic modulus in a compression direction at the time of axial vibration. In short, increasing the area of the inclined surface of the second contact portion 21b projected on a flat surface along the radial direction can raise the elastic modulus in the compression direction at the time of axial vibration.

The bottom surface 211a is an outer peripheral surface having a smaller diameter than the outer diameter D1 of the first contact portion 21a. As illustrated in FIG. 11, the bottom surface 211a is in contact with an inner peripheral bottom surface 22e of the rubber 22.

Furthermore, as illustrated in FIG. 12, the bottom surface 211a is provided with a plurality of grooves 211b. The plurality of grooves 211b is formed in an annular shape over the entire circumferential direction, and provided at positions spaced apart in the axial direction. The grooves 211b are structures for clearance space for rubber compression at the time when the rubber 22 is assembled to the mass body 21.

Furthermore, as the clearance space, an R portion 211c is provided between the first contact portion 21a and the second contact portion 21b. A gap can be formed between the R portion 211c and the rubber 22.

Furthermore, as illustrated in FIG. 11, a pair of second contact portions 21b whose inclination directions are reversed is provided on both axial sides of the bottom surface 211a. That is, one recess 211 includes the second contact portion 21b as one inclined surface provided on one axial side and the second contact portion 21b as the other inclined surface provided on the other axial side. As a result, when the mass body 21 moves back and forth along the axial direction, the inclined surface formed by the second contact portion 21b can push the rubber 22, and cause compressive stress to act on the rubber 22.

The holder 23 includes a third contact portion 23a and a fourth contact portion 23b as contact portions in contact with the rubber 22. The third contact portion 23a is in contact with the third contact surface 22c. The fourth contact portion 23b is in contact with the fourth contact surface 22d.

The third contact portion 23a is formed in a cylindrical shape having the same diameter. The outer diameter of the third contact portion 23a is larger than the outer diameter D1 of the first contact portion 21a. When the dynamic damper 20 is in the damper inclination mode, swinging of the mass body 21 causes a load from the third contact portion 23a of the holder 23 to act on the third contact surface 22c of the rubber 22, and causes compressive stress to act on the rubber 22.

The fourth contact portion 23b is included in the protrusion 231 protruding radially inward from the third contact portion 23a. That is, the protrusion 231 includes the fourth contact portion 23b and an inner peripheral surface 23c. The fourth contact portion 23b is inclined to the axial direction. The inner peripheral surface 23c is parallel to the axial direction. When the dynamic damper 20 is in the damper front-rear mode, linear motion of the mass body 21 causes a load from the fourth contact portion 23b of the holder 23 to act on the fourth contact surface 22d of the rubber 22, and causes compressive stress to act on the rubber 22.

As illustrated in FIG. 12, an inner diameter d1 of the inner peripheral surface 23c is smaller than the outer diameter D1 of the first contact portion 21a. As a result, an axial spring action can be obtained by elastic force in the compression direction of the rubber 22. As illustrated in FIG. 11, the inner peripheral surface 23c is not in contact with an outer peripheral bottom surface 22f of the rubber 22. That is, a radial gap is provided between the outer peripheral bottom surface 22f of the rubber 22 and the inner peripheral surface 23c of the holder 23. Furthermore, an outer peripheral surface 232 of the holder 23 is in contact with an inner peripheral surface 92a of the counter shaft 92.

For example, in the dynamic damper 20, the rubber 22 is joined to the mass body 21, and the rubber 22 is joined to the holder 23. As a result, when the mass body 21 vibrates, the mass body 21 can be reliably held by the holder 23.

Temperature Characteristics of Rubber

Figure 13:
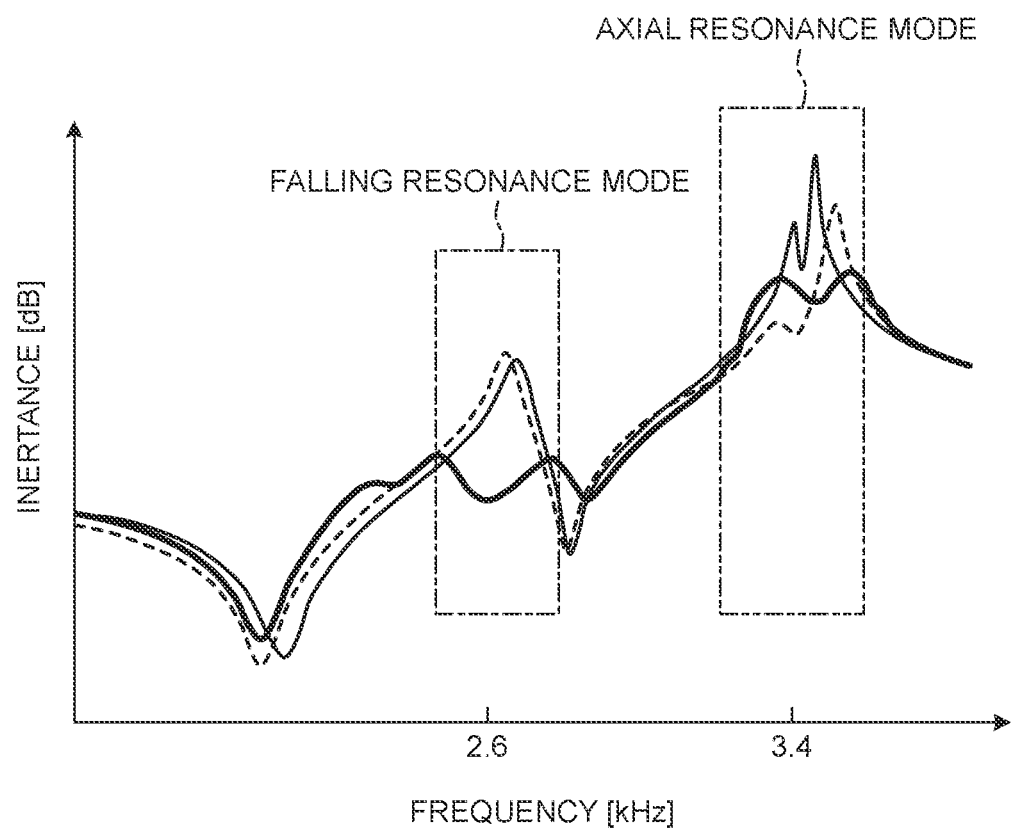
FIG. 13 is a graph illustrating a damping effect generated by the dynamic damper.

FIG. 13 is a graph illustrating a damping effect generated by the dynamic damper. In FIG. 13, the relation between the frequency and the inertance in the dynamic damper 20 is indicated by a thick solid line. Note that, in FIG. 13, the relation between the frequency and the inertance in the case where no dynamic damper is provided is indicated by a thin solid line for comparison.

As illustrated in FIG. 13, according to the dynamic damper 20, the damper inclination mode is set in accordance with the falling resonance mode, whereby the inertance at the resonance frequency can be reduced. Similarly, according to the dynamic damper 20, the damper front-rear mode is set in accordance with the axial resonance mode, whereby the inertance at the resonance frequency can be reduced.

In the dynamic damper 20, the elastic modulus of the rubber 22 is adjusted in accordance with the temperature of lubricating oil in the case 12 from the temperature characteristics of the elastic modulus of the rubber 22, and the resonance frequency of the counter driven gear 91 and the damper resonance frequency are matched with each other. For example, the normal temperature of the lubricating oil is in a temperature range of 40 to 60° C.

For that reason, as illustrated in FIG. 13, when the temperature of the lubricating oil is 40 to 60° C., the elastic modulus of the rubber 22 is adjusted to match the resonance frequency in the falling resonance mode and the resonance frequency in the axial resonance mode. In the case of the dynamic damper 20 in which the elastic modulus of the rubber 22 is adjusted as described above, if the temperature of the lubricating oil is lower than 25° C., the damping effect at the resonance frequency of the counter driven gear 91 is reduced as indicated by a broken line in FIG. 13. As described above, the dynamic damper 20 can be configured in consideration of the relation between the temperature of lubricating oil and the temperature characteristics of the elastic modulus of the rubber 22.

As described above, according to the embodiment, in relation to the resonance frequency of the dynamic damper 20, the resonance frequency in the damper front-rear mode is higher than the resonance frequency in the damper inclination mode. As a result, the resonance frequency of the dynamic damper 20 can be adjusted to the frequencies in both the falling resonance mode and the axial resonance mode, and both the falling resonance and the axial resonance of the counter driven gear 91 can be damped.

Furthermore, the dynamic damper 20 arranged inside (in the shaft center portion of) the counter shaft 92 damps vibration before the vibration is transmitted from the first bearing 14 and the second bearing 15 to the case 12, so that vibration transmission is inhibited, and radiation sound from the case 12 can be reduced.

Furthermore, the dynamic damper 20 can be made small and lightweight with a simple structure. As a result, vibration and noise can be inhibited at low cost. Moreover, a soundproof cover of the case 12 can be simplified, and the size and cost of the entire unit can be reduced.

Note that, although an example in which the rubber 22 is joined to the mass body 21 and the rubber 22 is joined to the holder 23 has been described in the above-described embodiment, the present disclosure is not limited thereto. The rubber 22 is not required to be joined to the mass body 21. Moreover, the rubber 22 is not required to be joined to the holder 23.

Furthermore, the inner peripheral surface 23c of the holder 23 may be in contact with the outer peripheral bottom surface 22f of the rubber 22. That is, a radial gap is not required to be provided between the outer peripheral bottom surface 22f of the rubber 22 and the inner peripheral surface 23c of the holder 23.

Furthermore, the mass body 21 is not limited to the structure having the recess 211 recessed radially inward from the columnar non-contact portion 212, and may have a structure having a protrusion protruding radially outward from the columnar non-contact portion instead of the recess 211. That is, the above-described uneven structure may be the mass body 21, the rubber 22, and the holder 23 having a shape of reverse relation. In the case, the mass body 21 includes a protrusion instead of the recess 211. The rubber 22 includes a protrusion instead of the recess 221. The holder 23 includes a recess instead of the protrusion 231.

Figure 14:
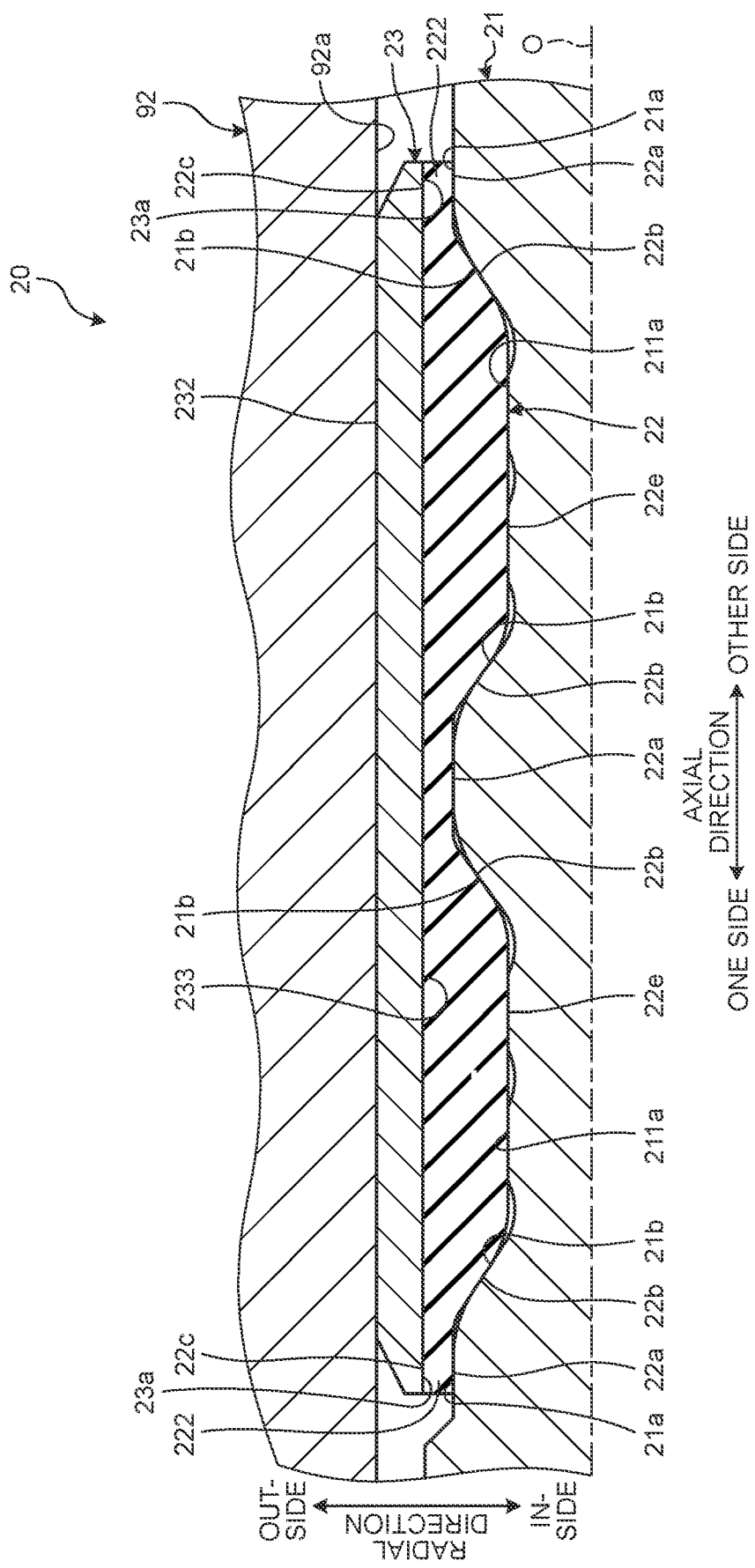
FIG. 14 is a cross-sectional view for illustrating a dynamic damper according to a variation.

Furthermore, the holder 23 is not limited to the structure having the protrusion 231 on the inner peripheral portion, and may be formed in a cylindrical shape as a whole. That is, the holder 23 may have a shape with a constant inner diameter, and the rubber 22 may have a shape with a constant outer diameter. FIG. 14 illustrates a dynamic damper 20 of the variation.

As illustrated in FIG. 14, the holder 23 includes an inner peripheral surface 233 parallel to the axial direction over the entire axial area. The inner peripheral surface 233 is in contact with the entire outer peripheral portion of the rubber 22. That is, the outer peripheral surface of the rubber 22 is formed in a surface parallel to the axial direction over the entire axial area. As illustrated in FIG. 14, the outer peripheral surface of the rubber 22 is formed to have the same outer diameter as the third contact surface 22c. Furthermore, the holder 23 is formed to have the inner peripheral surface 233 having the same inner diameter as the third contact portion 23a.

Moreover, in the variation, the holder 23 may include one cylindrical member. In the case, the assemblability between the holder 23 and the rubber 22 is improved. That is, at the time of assembly, the rubber 22 can be attached to the outer peripheral portion of the mass body 21, and the mass body 21 and the rubber 22, which have been integrated, can be inserted into the holder 23 in the axial direction. At the time, the mass body 21 and the rubber 22 can be press-fitted into the holder 23 by sliding the outer peripheral surface of the rubber 22 on the inner peripheral surface 233 of the holder 23. As described above, the inner peripheral surface 233 of the holder 23 and the outer peripheral surface of the rubber 22 are parallel to the axial direction, which improves assemblability.

In the present disclosure, compressive stress acts on an elastic body both when a gear vibrates so as to fall from the radial direction of the rotation shaft to the axial direction side and when the gear vibrates along the axial direction of the rotation shaft. Furthermore, the elastic modulus at the time of axial vibration can be increased by a second contact surface as compared with that in the case where the contact surface between the elastic body and the mass body is parallel to the axial direction of the rotation shaft. As a result, damping effect can be exerted to both of vibration due to gear falling and axial vibration of the gear.

According to an embodiment, compressive stress acts on an elastic body both when a gear vibrates so as to fall from the radial direction of the rotation shaft to the axial direction side and when the gear vibrates along the axial direction of the rotation shaft. Furthermore, the elastic modulus at the time of axial vibration can be increased by a second contact surface as compared with that in the case where the contact surface between the elastic body and the mass body includes only a surface parallel to the axial direction of the rotation shaft. As a result, damping effect can be exerted to both of vibration due to gear falling and axial vibration of the gear.

According to an embodiment, the mass body can be held in a vibratable manner in a state where the elastic body is in contact with a part of the mass body.

According to an embodiment, the contact area can be increased by a second contact portion, and the elastic modulus in the axial direction in the case where the mass body vibrates in the axial direction can be increased.

According to an embodiment, when the gear vibrates so as to fall from the radial direction of the rotation shaft to the axial direction side, the mass body can vibrate to the swing state in response to the vibration.

According to an embodiment, the resonance frequency for addressing the case where the gear vibrates in the axial direction can be made higher than the resonance frequency for addressing the case where the gear vibrates so as to fall from the radial direction to the axial direction side.

According to an embodiment, a holder can integrally hold the mass body and the elastic body. Moreover, the assemblability at the time when the mass body and the elastic body are assembled to the holder is improved.

According to an embodiment, a holder can integrally hold the mass body and the elastic body.

According to an embodiment, when the gear vibrates so as to fall from the radial direction of the rotation shaft to the axial direction side, compressive stress acts on the elastic body by a load acting on the first contact surface and the third contact surface. Furthermore, when the gear vibrates along the axial direction of the rotation shaft, compressive stress acts on the elastic body by a load acting on the second contact surface and the fourth contact surface.

According to an embodiment, it is possible to inhibit resonance with thrust force generated at the meshing portion of helical gears, which serves as compelling force.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dynamic damper for inhibiting vibration generated by a gear attached to a rotation shaft, the dynamic damper comprising:
   a mass body that is disposed inside the rotation shaft of hollow shape and extends along a shaft center of the rotation shaft; and
   an elastic body interposed between the mass body and the rotation shaft,
   wherein the mass body is allowed to vibrate to a linear motion state in which the mass body reciprocates along the shaft center of the rotation shaft,
   the elastic body includes:
   a first contact surface that is in contact with the mass body and parallel to an axial direction of the rotation shaft; and
   a second contact surface that is in contact with the mass body at a position different from the first contact surface and not parallel to the axial direction of the rotation shaft,
   when the gear generates vibration so as to fall from a radial direction of the rotation shaft to an axial direction side of the rotation shaft, compressive stress acts on the elastic body by the mass body vibrating so as to push the first contact surface in response to the vibration, and
   when the gear generates vibration along the axial direction of the rotation shaft, compressive stress acts on the elastic body by the mass body coming in the linear motion state in response to the vibration and vibrating so as to push the second contact surface,
   wherein the mass body includes:
   a contact portion in contact with the elastic body at a central side in the axial direction of the rotation shaft; and
   a non-contact portion that is positioned at both end sides in the axial direction of the rotation shaft of the contact portion and not contact with the elastic body, and
   the contact portion includes:
   a first contact portion in contact with the first contact surface; and
   a second contact portion in contact with the second contact surface.

2. The dynamic damper according to claim 1, wherein the second contact portion is formed to have an inclination angle from the radial direction of the rotation shaft, the inclination angle being larger than 0 degrees and smaller than 90 degrees.

3. The dynamic damper according to claim 1, wherein the gear includes a helical gear.

4. A dynamic damper for inhibiting vibration generated by a gear attached to a rotation shaft, the dynamic damper comprising:
   a mass body that is disposed inside the rotation shaft of hollow shape and extends along a shaft center of the rotation shaft; and
   an elastic body interposed between the mass body and the rotation shaft,
   wherein the mass body is allowed to vibrate to a linear motion state in which the mass body reciprocates along the shaft center of the rotation shaft,
   the elastic body includes:
   a first contact surface that is in contact with the mass body and parallel to an axial direction of the rotation shaft; and
   a second contact surface that is in contact with the mass body at a position different from the first contact surface and not parallel to the axial direction of the rotation shaft,
   when the gear generates vibration so as to fall from a radial direction of the rotation shaft to an axial direction side of the rotation shaft, compressive stress acts on the elastic body by the mass body vibrating so as to push the first contact surface in response to the vibration, and
   when the gear generates vibration along the axial direction of the rotation shaft, compressive stress acts on the elastic body by the mass body coming in the linear motion state in response to the vibration and vibrating so as to push the second contact surface,
   wherein the mass body is allowed to vibrate to a swing state in which the mass body swings to a posture inclined to the shaft center of the rotation shaft,
   when the gear generates vibration so as to fall from the radial direction of the rotation shaft to the axial direction side of the rotation shaft, the mass body comes in the swing state in response to the vibration, and
   wherein a resonance frequency at a time when the mass body vibrates to the linear motion state is higher than a resonance frequency at a time when the mass body vibrates to the swing state.

5. A dynamic damper for inhibiting vibration generated by a gear attached to a rotation shaft, the dynamic damper comprising:

a mass body that is disposed inside the rotation shaft of hollow shape and extends along a shaft center of the rotation shaft; and an elastic body interposed between the mass body and the rotation shaft, wherein the mass body is allowed to vibrate to a linear motion state in which the mass body reciprocates along the shaft center of the rotation shaft, the elastic body includes:

a first contact surface that is in contact with the mass body and parallel to an axial direction of the rotation shaft; and a second contact surface that is in contact with the mass body at a position different from the first contact surface and not parallel to the axial direction of the rotation shaft, when the gear generates vibration so as to fall from a radial direction of the rotation shaft to an axial direction side of the rotation shaft, compressive stress acts on the elastic body by the mass body vibrating so as to push the first contact surface in response to the vibration, and when the gear generates vibration along the axial direction of the rotation shaft, compressive stress acts on the elastic body by the mass body coming in the linear motion state in response to the vibration and vibrating so as to push the second contact surface, the dynamic damper further comprising:

a holder of tubular shape, which is provided inside the rotation shaft and integrally holds the mass body and the elastic body, wherein the elastic body includes a third contact surface that is in contact with the holder and parallel to the axial direction of the rotation shaft.

6. The dynamic damper according to claim 5, wherein the elastic body includes a fourth contact surface that is in contact with the holder at a position different from the third contact surface and not parallel to the axial direction of the rotation shaft.

7. The dynamic damper according to claim 6, wherein, when the gear generates vibration so as to fall from the radial direction of the rotation shaft to the axial direction side of the rotation shaft, the mass body vibrating in response to the vibration causes a load from the holder to act on the third contact surface and compressive stress to act on the elastic body, and when the gear generates vibration along the axial direction of the rotation shaft, the mass body vibrating in response to the vibration causes a load from the holder to act on the fourth contact surface and compressive stress to act on the elastic body.

* * * * *